2,908,104
FISHING LURE

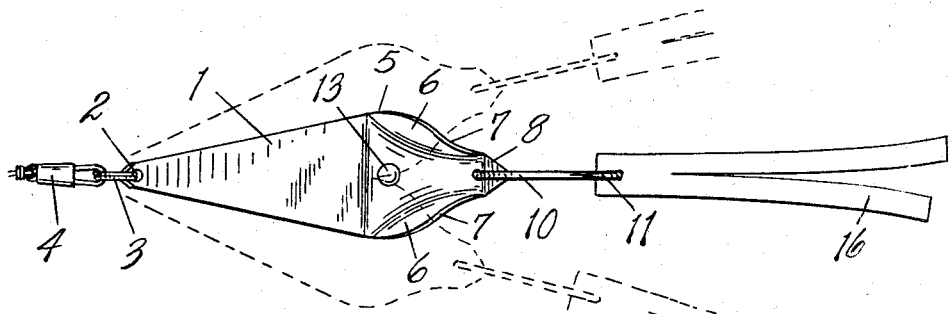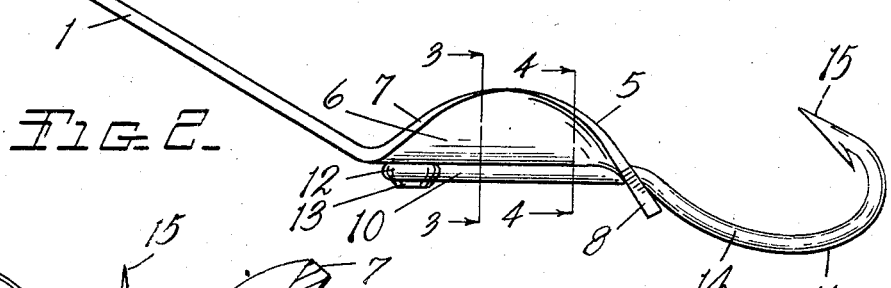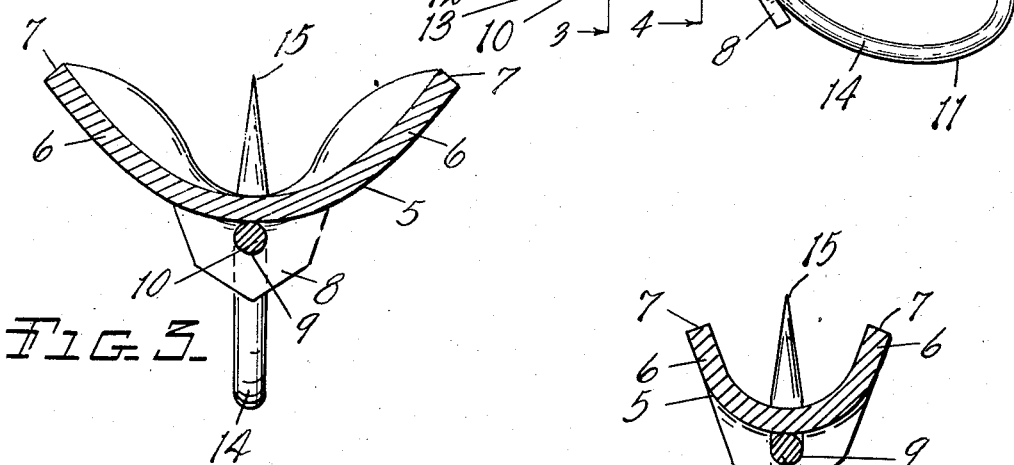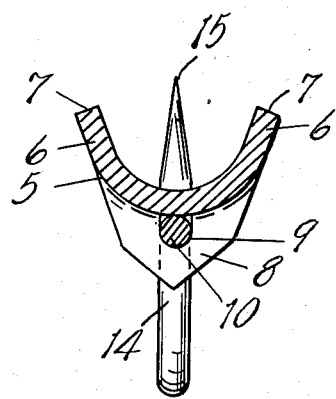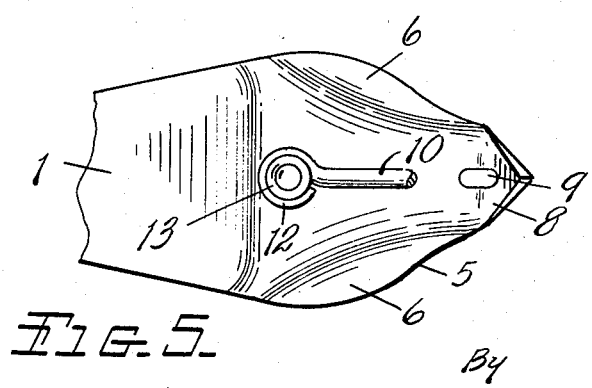

John H. Hutchins, Niles, and Paul M. Michalke, Eau Claire, Mich.

Application April 2, 1957, Serial No. 650,199

5 Claims. (Cl. 43—42.52)

This invention relates to a fishing lure designed to travel below the surface of the water as it is propelled or drawn therethrough.

The main objects of this invention are:

First, to provide a fishing lure which maintains its upright position when drawn through the water and has a lateral swinging movement relative to the end of the line attached thereto, that is, the bait as propelled travels in the line of pull thereon as distinguished from having a zig-zag travel.

Second, to provide a fishing lure having these characteristics which is substantially weedless and maintains its upright position when drawn through the water.

Third, to provide a lure of this character which when drawn through the water creates substantial disturbance therein which aids in the attracting of fish.

Objects relating to details and economies of the invention will appear from the description to follow. The invention is defined and pointed out in the claims.

A preferred embodiment of the invention is illustrated in the accompanying drawing, in which:

Fig. 1 is a plan view of a lure embodying our invention, the lateral swinging movement of the lure when drawn through the water being indicated by dotted lines, a bait on the hook being conventionally illustrated.

Fig. 2 is an enlarged side elevational view of the bait with the line and its attaching means and the bait shown in Fig. 1 omitted.

Fig. 3 is an enlarged transverse sectional view on a line corresponding to line 3—3 of Fig. 2.

Fig. 4 is an enlarged transverse sectional view on a line corresponding to line 4—4 of Fig. 2.

Fig. 5 in an enlarged fragmentary inverted view.

It is desired to point out that in Fig. 1 the lure is illustrated in a commercial size thereof, a lure of the size and proportions illustrated being highly practical. It is further desired to point out that the angular relation of the front and rear portions of the body member as illustrated in Fig. 2 is also a desirable commercial relation.

In the embodiment of our invention illustrated the body member of the lure comprises a rearwardly inclined forwardly tapered front portion 1 of flat section tapering forwardly to a pointed tip having a hole 2 therein for the line attaching link 3 with which the line swivel 4 is engaged. The rear portion of the body designated generally by the numeral 5 is disposed at an angle to the front portion 1, the angle desirably being approximately 30°.

The rear portion 5 has upwardly projecting outwardly flaring side portions or wings 6 which are longitudinally and vertically curved or which have a compound curvature as is illustrated. The upper edges 7 of these sides 6 merge into the edges of the front portion 1. These upwardly flaring side portions 6 taper rearwardly as is illustrated in the drawing.

The rear portion has a downward tapering rear end 8 having a hole 9 therein adapted to receive the shank 10 of the hook 11. In the embodiment illustrated the hook 11 has a substantially straight front portion terminating in an eye 12, the straight portion of the shank being arranged through the hole 9 in the downturned rear portion of the body member. The rivet 13 disposed through the eye of the hook and the body of the lure prevents rotation of the hook relative to the body member of the lure.

The hook of the embodiment of our invention illustrated has a downwardly curved rear portion 14. It will be noted that the tip 15 of the hook is positioned so that the body member serves as a weed guard therefor. This shaping and the relationship of the front and rear portions of the body member described maintains the lure in an upright position when it is drawn through the water and results in the lateral swinging movement thereof on the line attaching link 3 as indicated by dotted lines in Fig. 1.

The path of the lure through the water is in a substantially straight line in the direction of pull thereon, that is, it does not have a zig-zag movement, and it does not have a spinning movement, but, as stated, the lure swings back and forth or has an oscillating movement substantially as indicated by dotted lines in Fig. 1. This imparts a swinging movement to the bait indicated at 16.

We have illustrated a practical commercial embodiment of our invention and one resulting in the movement described which appears to be attractive to fish.

Having thus described the invention, what is claimed as new and is desired to be secured by Letters Patent is:

1. In a fishing lure, a body member comprising a rearwardly inclined front portion of flat section tapering forwardly to a pointed tip, and a rear portion into which said front portion merges and is disposed at an angle thereto of approximately 30°, said rear portion having upwardly projecting outwardly flaring rearwardly converging compoundedly curved sides having upwardly curved edges merging into the edges of said front portion, said rear portion terminating in a downwardly projecting rear end having a central opening therein adapted to receive the shank of a hook, a hook provided with a shank having a straight forward portion and a downwardly curved rear portion, the straight portion of said hook shank being disposed through said opening in said downwardly projecting rear end and against the underside of said rear body portion, said shank terminating in an eye disposed flatwise against and secured to said rear body portion by a rivet disposed therethrough, the tip of said hook being directed upwardly and positioned in rearwardly spaced relation to said body member which constitutes a guard therefor, and a line attaching link at the front end of said front portion constituting a pivot permitting lateral swinging of the lure as it is propelled through water by a line.

2. In a fishing lure, a body member comprising a rearwardly inclined front portion of flat section tapering forwardly to a pointed tip, and a rear portion into which said front portion merges and is disposed at an angle thereto, said rear portion having upwardly projecting outwardly flaring rearwardly converging curved sides, said rear portion terminating in a downwardly projecting rear end having a central opening therein adapted to receive the shank of a hook, said sides having upwardly curved edges merging into the edges of said front portion, a hook provided with a shank disposed through said opening in said downwardly projecting rear end and against the underside of said rear body portion, said shank terminating in an eye disposed flatwise against and secured to said rear body portion by a rivet disposed therethrough with the tip of said hook being directed upwardly and positioned in rearwardly spaced relation to said body member which constitutes a guard therefor, and line attaching means at the front end of said front portion permitting lateral swinging of the lure as it is propelled through water by a line.

3. In a fishing lure, a body member comprising a forwardly tapered rearwardly inclined front portion of flat section, and a rear portion into which said front portion merges and is disposed at a substantial angle thereto, said rear portion having upwardly projecting outwardly flaring and rearwardly converging curved sides having upwardly curved edges merging into the edges of said front portion, said rear portion terminating in a downwardly projecting rear end portion having an opening therein adapted to receive the shank of a hook, a hook provided with a shank disposed through said opening in said downwardly projecting rear end portion and positioned on the underside of said rear body portion and fixedly secured thereto with the tip of the hook directed upwardly in rearwardly spaced relation to said body member which constitutes a guard therefor, and a line attaching means at the front end of said front portion permitting lateral swinging of the lure as it is propelled through water by a line.

4. In a fishing lure, a body member comprising an elongated rearwardly inclined front portion of flat section tapering forwardly and uniformly to a tip, and a relatively short rear portion integral with and into which said front portion merges and disposed at an angle thereto of approximately 30°, said rear portion having upwardly projecting outwardly flaring compoundedly curved and rearwardly converging sides having upwardly curved edges merging into the edges of the front portion, said front portion being of a length substantially exceeding that of said rear portion, a hook provided with a shank disposed on the underside of said rear portion centrally thereof and fixedly secured thereto with the tip of the hook directed upwardly and spaced rearwardly of the rear end of said rear portion with the front portion projecting upwardly relative to the plane of the tip of the hook and constituting a guard therefor, and a line attaching means at the tip of said front portion.

5. In a fishing lure, a body member comprising an elongated rearwardly inclined front portion of flat section tapering forwardly and uniformly to a tip, and a relatively short rear portion integral with and into which said front portion merges and disposed at an angle thereto, said rear portion having upwardly projecting outwardly flaring compoundedly curved and rearwardly converging sides having upwardly curved edges merging into the edges of the front portion, said front portion being of a length substantially exceeding that of said rear portion, a hook provided with a shank disposed on the underside of said rear body portion centrally thereof and fixedly secured thereto with the tip of the hook directed upwardly and spaced rearwardly of the rear end of said body member, the front portion projecting above the plane of the tip of the hook as the lure is propelled through water by a line attached to the tip of the portion.

References Cited in the file of this patent
UNITED STATES PATENTS

| | | |
|---|---|---|
| 1,575,139 | Wiesenfeld | Mar. 2, 1926 |
| 1,803,056 | Davis | Apr. 28, 1931 |
| 1,888,641 | Toepper | Nov. 22, 1932 |
| 1,992,766 | Pflueger | Feb. 26, 1935 |
| 2,180,918 | Verzi | Nov. 21, 1939 |
| 2,214,266 | Haury | Sept. 10, 1940 |
| 2,545,797 | Secrest et al. | Mar. 20, 1951 |
| 2,619,764 | Mellin | Dec. 2, 1952 |
| 2,700,240 | Gibbs | Jan. 25, 1955 |